US010958099B2

(12) United States Patent
Biswas et al.

(10) Patent No.: US 10,958,099 B2
(45) Date of Patent: Mar. 23, 2021

(54) REAL-TIME ELECTRICAL GRID RESTORATION

(71) Applicant: General Electric Technology GmbH, Baden (CH)

(72) Inventors: Saugata Swapan Biswas, Redmond, WA (US); Srinivas Musunuri, Redmond, WA (US); Siddharth Likhate, Redmond, WA (US); Anil Kumar Jampala, Redmond, WA (US); Manu Parashar, Redmond, WA (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 245 days.

(21) Appl. No.: 15/901,574

(22) Filed: Feb. 21, 2018

(65) Prior Publication Data

US 2019/0260230 A1    Aug. 22, 2019

(51) Int. Cl.
*G05B 19/042* (2006.01)
*H02J 13/00* (2006.01)
*H02J 3/38* (2006.01)

(52) U.S. Cl.
CPC ...... *H02J 13/00004* (2020.01); *G05B 19/042* (2013.01); *H02J 3/388* (2020.01); *H02J 13/00002* (2020.01); *H02J 13/0004* (2020.01); *H02J 13/00007* (2020.01); *G05B 2219/2639* (2013.01); *H02J 2203/10* (2020.01)

(58) Field of Classification Search
None
See application file for complete search history.

(56) References Cited

U.S. PATENT DOCUMENTS

| 6,061,735 | A | * | 5/2000 | Rogers | H04L 41/00 370/221 |
| 9,979,202 | B2 | * | 5/2018 | Sudan | H02J 13/00007 |
| 2011/0313585 | A1 | * | 12/2011 | Park | H02J 3/32 700/295 |
| 2012/0253539 | A1 | * | 10/2012 | McMullin | H02J 13/0013 700/297 |
| 2013/0197702 | A1 | * | 8/2013 | Arvind | H02J 3/0073 700/286 |

(Continued)

*Primary Examiner* — Jennifer L Norton
(74) *Attorney, Agent, or Firm* — Buckley, Maschoff & Talwalkar LLC

(57) ABSTRACT

This disclosure relates to systems and methods for real-time electrical power grid restorations. An example system may include a real-time monitoring module configured to acquire operational data associated with electrical grid components of an electrical grid. The system may further include a restoration manager module configured to detect, based on the operational data, one or more unplanned outages or other events in the electrical grid. In response to the detection, the restoration manager module can analyze the operational data to determine or select from a database a restoration plan. The restoration plan can include operations associated with commands for control devices, wherein the control devices are operable to control a power transmission between the electrical grid components. The restoration manager module can be further configured to execute the one or more operations of the restoration plan to restore the electrical power grid to a normal operational state.

20 Claims, 4 Drawing Sheets

(56) References Cited

U.S. PATENT DOCUMENTS

| | | | | |
|---|---|---|---|---|
| 2013/0338945 A1* | 12/2013 | Feng | H02J 13/00012 | 702/58 |
| 2013/0346057 A1* | 12/2013 | Lin | H02J 3/00 | 703/18 |
| 2015/0171629 A1* | 6/2015 | Jain | H02J 3/00 | 700/286 |
| 2015/0229130 A1* | 8/2015 | Yamane | G05B 15/02 | 700/297 |
| 2015/0263522 A1* | 9/2015 | Bernal | H02J 13/00001 | 700/295 |
| 2017/0315520 A1* | 11/2017 | Bhageria | G06Q 10/00 | |
| 2018/0054063 A1* | 2/2018 | Parashar | H02J 13/00034 | |
| 2019/0186952 A1* | 6/2019 | Schwartz | H02J 3/003 | |

* cited by examiner

REAL-TIME ELECTRICAL GRID RESTORATION

TECHNICAL FIELD

The disclosure relates to managing electrical grids, and, more specifically, to systems and methods for real-time electrical grid restoration.

BACKGROUND

Operators of electrical power grids are required to have power system restoration plans. A restoration plan is a measure of preparedness for restoring the power system from an abnormal condition. The scope of a restoration plan may range from a relatively simple plan for restoring a few devices back to service, a relatively complex plan like resynchronization of multiple live islands, to a complex plan such as a black start plan intended to restore the power system from a complete blackout condition.

Given the complexity of power system conditions that arise during abnormal situations, conventional power system restoration processes may have some disadvantages caused by inadequate real-time information concerning islands, inadequate software-based decision support in selection of an appropriate restoration plan based on real-time system conditions, human errors while executing a restoration plan, unintentional topological changes, energization or de-energization of buses, equipment safety issues, island formation or resynchronization with non-sustainable frequency, and/or excessive load or generation jump. Such disadvantages may affect the reliability, security, safety, and efficiency of power system restoration processes.

SUMMARY OF THE DISCLOSURE

This disclosure relates to systems and methods for real-time electrical power grid restoration. Certain embodiments of the disclosure can provide procedures for monitoring and diagnostics of electrical grid issues, such as power outages. Some embodiments of the disclosure may facilitate real-time generation of restoration plans to restore the electrical grid to a normal operational state.

According to one embodiment of the disclosure, a system for electrical grid restoration is provided. The system may include a real-time monitoring module configured to acquire operational data associated with electrical grid components of an electrical grid. The system may further include a restoration manager module configured to detect, based on the operational data, one or more events in the electrical grid. The events may include unplanned outages in the electrical grid. In response to the detection, the restoration manager module can be further configured to analyze the operational data to determine a restoration plan. The restoration plan can be selected from pre-existing plans stored in a database. If requested by a user and in the absence of a suitable plan in the database, the restoration plan can be generated based on the operational data. The restoration plan may include one or more operations associated with commands for at least one control device, wherein the at least one control device is operable to control power transmission between the electrical grid components. The restoration manager module can be further configured to execute the one or more operations of the restoration plan to restore the electrical grid to a normal operational state.

In some embodiments of the disclosure, the restoration manager module can be further configured to determine, based on the operational data a location of at least one island in the electrical grid and location and electrical conditions of inter-island synchronization points. The restoration manager module can be further configured to detect, based on the operational data, a microgrid in the at least one island.

In some embodiments of the disclosure, prior to the determination of the restoration plan, the restoration manager module can determine, based on the operational data at least one of the electrical grid components going out of service or coming back in to service, a location of the at least one of the electrical grid components, magnitude and location of a generation loss or a load loss in the electrical grid, megawatt and megavolt ampere reactive reserves in the electrical grid, a frequency and a rate-of-change-of-frequency in the electrical grid, an inertia of the electrical grid, and steady state and dynamic violations in the electrical grid.

In some embodiments of the disclosure, the restoration manager module can be further configured to select, based on the operational data, the restoration plan from at least one pre-defined restoration plan. The at least one pre-defined restoration plan can be stored in a database in a node-breaker format.

In some embodiments of the disclosure, the restoration manager module can be further configured to receive, from a user, an input of at least one source and at least one destination of the electrical grid components. The restoration manager module can be further configured to acquire physical conditions of the electrical grid. The restoration manager module can be further configured to estimate a feasibility of one or more operations for restoration of the electrical grid. The restoration manager module can be further configured to compute, based on the physical conditions and the feasibility, the restoration plan for restoration of the power transmission from the at least one source to the at least one destination.

In some embodiments of the disclosure, the restoration manager module can be further configured to predict changes in the operational data and inconsistencies resulting from the execution of the one or more operations of the restoration plan. In some embodiments of the disclosure, the analysis to the predict changes and inconsistencies in the operational data may include a topology analysis, a steady state analysis, or a dynamic analysis. The restoration manager module can be further configured to provide a real-time feedback for changes in the operational data after the execution of the one or more operations of the restoration plan.

According to another embodiment of the disclosure, a method for electrical grid restoration is provided. The method may include acquiring, by a real-time monitoring module, operational data associated with electrical grid components of an electrical grid. The method may further include detecting, by a restoration manager module and based on the operational data, one or more events in the electrical grid. The events may include unplanned outages in the electrical grid. In response to the detection, the method may analyze, by the restoration manager module, the operational data to determine a restoration plan. The restoration plan can be selected from pre-existing restoration plans stored in a database. If requested by a user and in the absence of a suitable plan in the database, the restoration plan can be generated based on the operational data. The restoration plan may include one or more operations associated with commands for at least one control device, wherein the at least one control device is operable to control power transmission between the electrical grid components. The method may further include executing, by the restoration manager module, the one or more operations of the restoration plan to restore the electrical grid to a normal operational state.

Other embodiments, systems, methods, features, and aspects will become apparent from the following description taken in conjunction with the following drawings.

DETAILED DESCRIPTION

Figure 1:
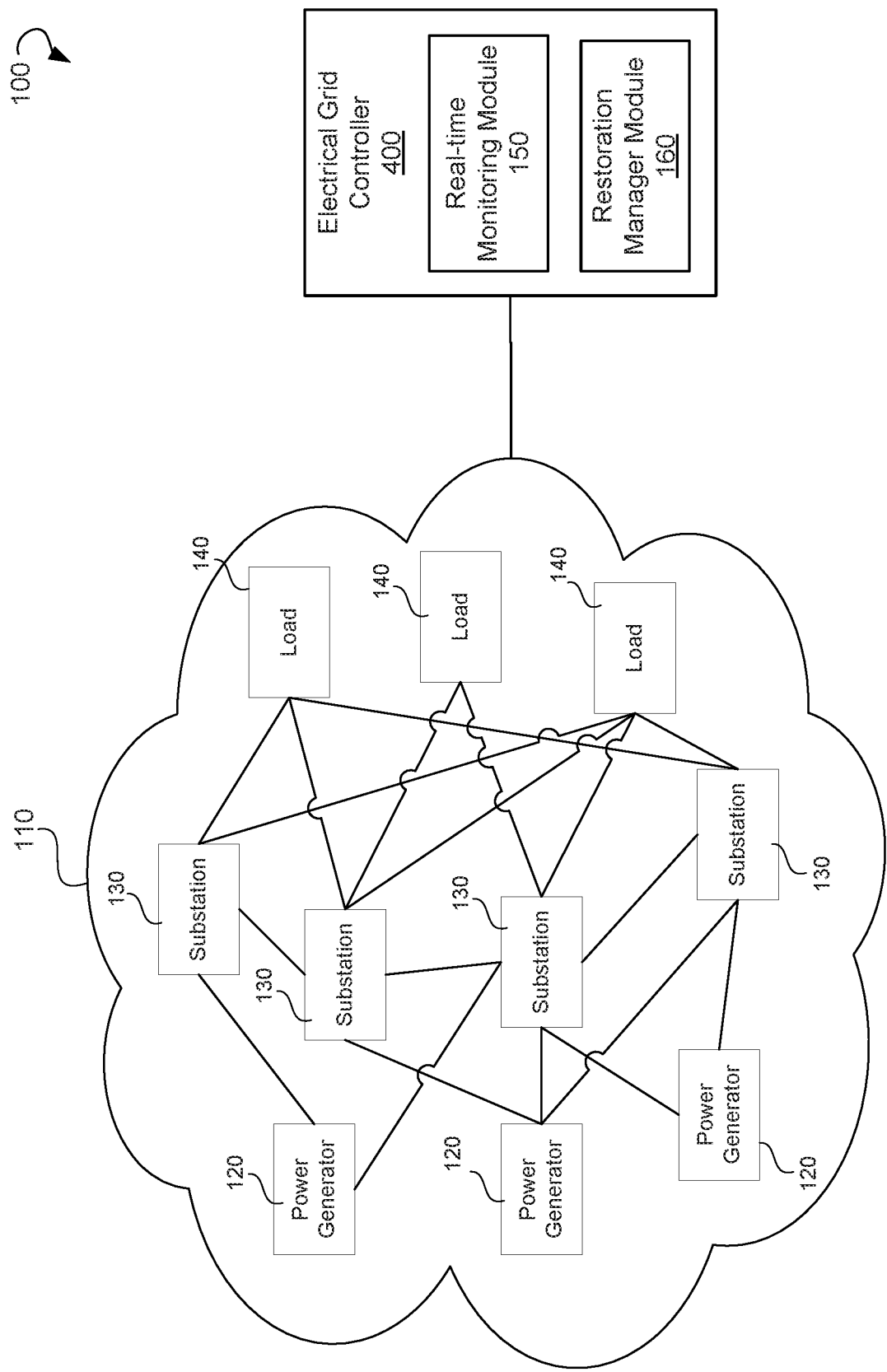
FIG. 1 is a block diagram illustrating an example system in which methods for real-time electrical grid restoration can be implemented, according to some embodiments of the disclosure.

The following detailed description includes references to the accompanying drawings, which form part of the detailed description. The drawings depict illustrations, in accordance with example embodiments. These example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. The following detailed description is, therefore, not to be taken in a limiting sense, and the scope is defined by the appended claims and their equivalents.

Certain embodiments of the disclosure can include systems and methods for electrical power grid restoration. Some embodiments of the disclosure can provide procedures for selection or generation of restoration plans based on real-time conditions of the electrical grid and performing predictive what-if analysis of the auto-generated and/or the pre-existing restoration plans. Some embodiments of the disclosure may be suitable for restoration of one or more devices, merging islands, and black start restoration.

In some example embodiments of the disclosure, a method for electrical power grid restoration may include acquiring, by a real-time monitoring module, operational data associated with electrical grid components of an electrical grid. The method may further include detecting, by a restoration manager module and based on the operational data, one or more unplanned outages or events in the electrical grid. In response to the detection, the method may further include analyzing, by a restoration manager module, the operational data to determine a restoration plan. The restoration plan can be selected from pre-existing restoration plans stored in a database. If requested by a user and in the absence of a suitable plan in the database, the restoration plan can be generated based on the operational data. The restoration plan may include one or more operations associated with commands for at least one control device, wherein the at least one control device is operable to control a power transmission between the electrical grid components. The method may further include executing, by the restoration manager module, the one or more operations of the restoration plan to restore the electrical grid to a normal operational state.

Technical effects of certain embodiments of the disclosure may include eliminating a manual process of selection and execution of electrical grid restoration plans. Further technical effects of certain embodiments of the disclosure may provide a restoration manager to be used in training environments and energy management system environments. Yet further technical effects of certain embodiments of the disclosure may provide for a reduction in unplanned shutdowns, forced outage time, and unplanned expenses.

The following provides a detailed description of various example embodiments related to systems and methods of real-time electrical grid restoration.

Turning now to the drawings, FIG. 1 is a block diagram illustrating a system 100, wherein the method for electrical grid restoration can be implemented in accordance with an example embodiment of the disclosure. The system 100 may include an electrical grid 110. The electrical grid 110 may include one or more components including one or more power generator(s) 120, one or more generator substation(s) 130, and/or one or more load(s) 140. The electrical grid 110 may further include transmission line(s) for transmission power between the electrical grid components and one or more control device(s) operable to control the transmission power between the electrical grid components. The control device(s) may include actuators, protective relays, circuit breakers, and so forth.

In some embodiments of the disclosure, the electrical grid 110 may include one or more phasor measurement units (PMU(s)) configured to measure operational data related to the electrical grid components. In certain embodiments, the system 100 may further include a supervisory control and data acquisition (SCADA) system operable to collect the operational data of the electrical grid components and provide management of the electrical grid 110.

The system 100 may further include an electrical grid controller 400. The electrical grid controller 500 may, in turn, include a real-time monitoring module 150 and restoration manager 160. In various embodiments, the real-time monitoring module 150 and restoration manager 160 can be implemented as instructions stored in a memory to be executed by one or more processors of the electrical grid controller 400. The real-time monitoring module 150 can be configured to receive operational data of the electrical grid components in real-time. The operational data can be received from PMU(s) and/or SCADA system. The restoration manager 160 can be further configured to determine whether the electrical grid 110 experiences one or more outages or other events, and can generate one or more restoration plans, if requested by the user in the absence of a suitable plan in the database, or analyze a pre-existing plan in the database to facilitate restoring the electrical grid 110 to a normal operational state. The restoration plan may include one or more operations associated with commands for control devices operable to control power transmission between the electrical grid components.

Figure 2:
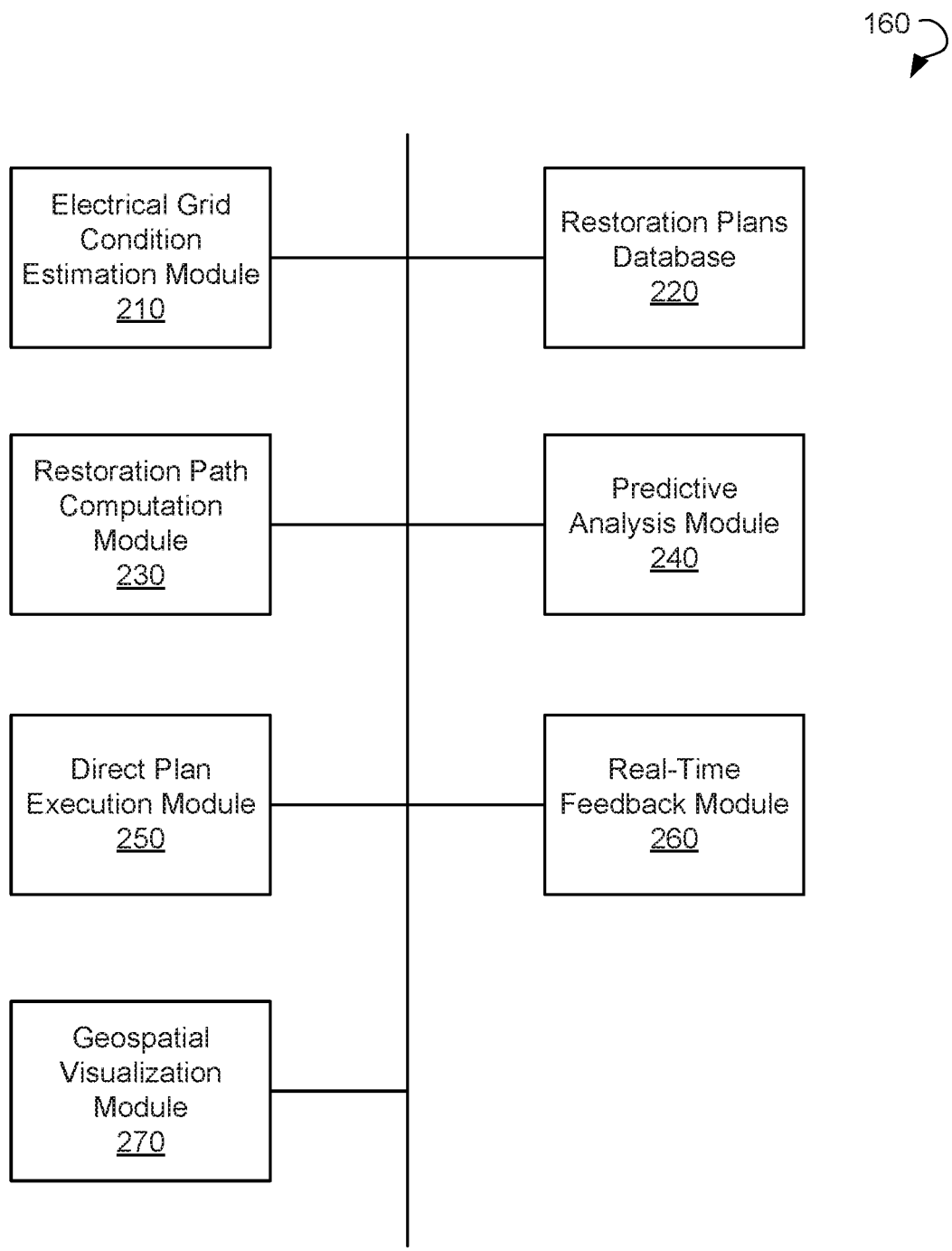
FIG. 2 is a block diagram showing an example restoration management system, according to some embodiments of the disclosure.

FIG. 2 is a block diagram illustrating an example restoration manager module 160, according to some embodiments of the disclosure. The restoration manager module 160 may include an electrical grid condition estimation module 210, a restoration plans database 220, a restoration path computation module 230, a predictive analysis module 240, a direct plan execution module 250, a real-time feedback module 260, and geospatial visualization module 270.

In some embodiments of the disclosure, electrical grid condition estimation module 210 can be operable to analyze operational data of the electrical grid components to determine conditions of electrical grid 110 prior to starting electrical grid restoration process. The analysis may include detection of one or more unplanned outages, or partial or a complete blackout in the electrical grid. The analysis may further include detection of system disturbances and impact of the system disturbances on the system. The analysis may further include determination of location of islanding events, island composition and available resources, such as megawatt reserves and megavolt-ampere reactive reserves. The analysis can also include determination of inter-island synchronization points and electrical conditions of the inter-island synchronization points.

In some embodiments of the disclosure, the analysis of the electrical grid condition may further include detection of microgrids in islands. The analysis may include detection of a decrease or an increase in a level of loads 140 and a decrease or an increase of power generation by power generator 120. In some embodiments of the disclosure, the restoration plans database 220 can be configured to store a set of restoration plans. An appropriate restoration plan can be selected from the set of the restoration plans based on real-time conditions of the electrical grid. The restoration plans can be stored in a node-breaker format, which is an example standard format for certain energy management systems.

In some embodiments of the disclosure, the restoration path computation module 230 can be configured to generate a restoration plan if the restoration database 220 does include a restoration plan appropriate for the current real-time conditions of the electrical grid 110. The generation of the restoration plan can be performed using a graph theory approach. The graph theory approach can be based on a user-defined heuristics. The restoration path computation module 220 can be further configured to receive an input from a user. The input may include a user-specified source and one or more user-specified destinations. In one instance, the source may include a black start unit, whereas the destination may include a non-blackstart unit, a critical load, a resynchronization point, and so forth. The restoration plan generated by module 230 may include operations to restore power transmission from the source to the destination.

In some embodiments, the predictive analysis module 240 can be configured to analyze operations in one or more selected or generated restoration plans to predict changes in the operational data of the electrical grid and inconsistencies resulting from the execution of the operations of the restoration plan. The predictive analysis may include a topology analysis to predict live-to-dead and dead-to-live bus transitions, which can be important to reliability and safety of electrical grid components. The predictive analysis may also include a steady state analysis to predict changes in generation, load, and violations. The predictive analysis may further include a dynamic analysis to predict changes in frequency, dynamic reserves, and frequency violations.

In some embodiments of the disclosure, the direct plan execution module 250 can be configured to execute directly one or more operations of the selected or generated restoration plan. The one or more operations may include SCADA controlled device operations. The direct execution of an operation from the restoration plan may reduce the chances of a human error arising from passive reading of plans followed by erroneous execution.

In some embodiments of the disclosure, the real-time feedback module 260 can be configured to provide real-time feedback with regard to conditions of the electrical grid after execution of one or more of operations of the restoration plan. The feedback may include actual live-to-dead and dead-to-live bus transitions, actual change in generation, load, and steady state violations, and actual change in frequency, dynamic reserves, and dynamic state violations.

In some embodiments of the disclosure, the geospatial visualization module 270 can be configured to display, via a graphical display system, vital parameters related to an electrical grid restoration. For example, the module 270 can be configured to provide visualization of key resources in the electrical grid that may play a pivotal role in the electrical grid restoration process. The key resources may include designated blackstart units, units with high ramp rates, critical loads, island synchronization points, and so forth. The module 270 can be configured to provide a visualization of real-time electrical grid conditions: voltage and frequency contours, violations, and so forth. The module 270 can be configured to visualize results of the predictive analysis performed by the module 240 and report on a progress of electrical system restoration.

Figure 3:
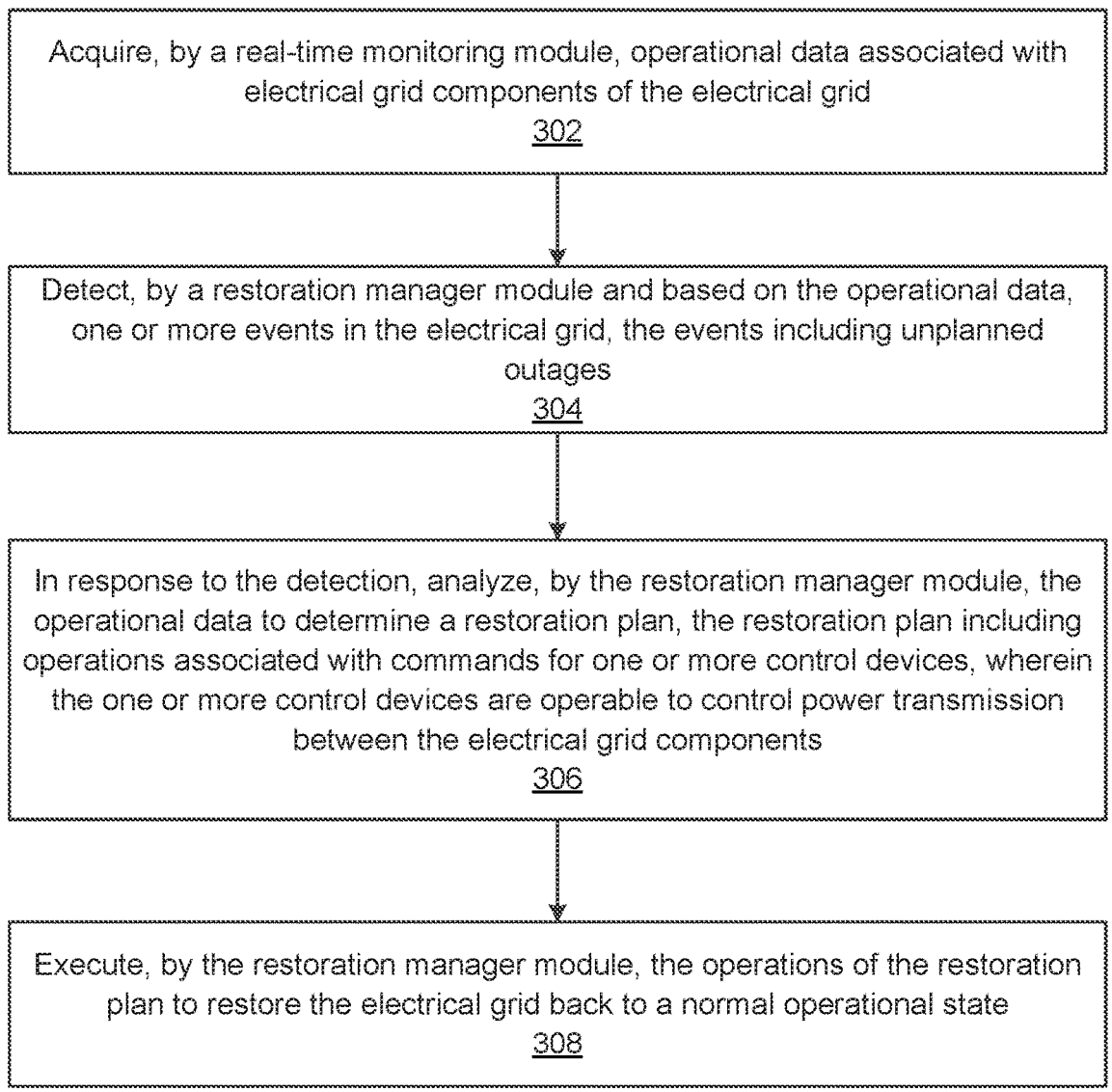
FIG. 3 is a flow chart illustrating an example method for real-time electrical grid restoration, according to some embodiments of the disclosure.

FIG. 3 is a flow chart illustrating an example method 300 for real-time electrical grid restoration, according to some embodiments of the disclosure. The method 300 can be implemented by the system 100 described above with reference to FIG. 1. In block 302, the method 300 may commence with acquiring, by a real-time monitoring module 150, operational data associated with electrical grid components of an electrical grid. In block 304, the method 300 may proceed with detecting, by a restoration manager module 160 and based on the operational data, one or more events in the electrical grid. The events may include unplanned outages of the electrical grid.

In block 306, the method 300 may analyze, in response to the detection of one or more unplanned outages, by the restoration manager module 160, the operational data to determine a restoration plan. The restoration plan may include one or more operations associated with commands for at least one control device. The control device can be configurable to control a power transmission between the electrical grid components. In block 308, the method 300 may execute, by the restoration manager module 160, one or more operations of the restoration plan to restore the electrical grid to a normal operational state.

Figure 4:
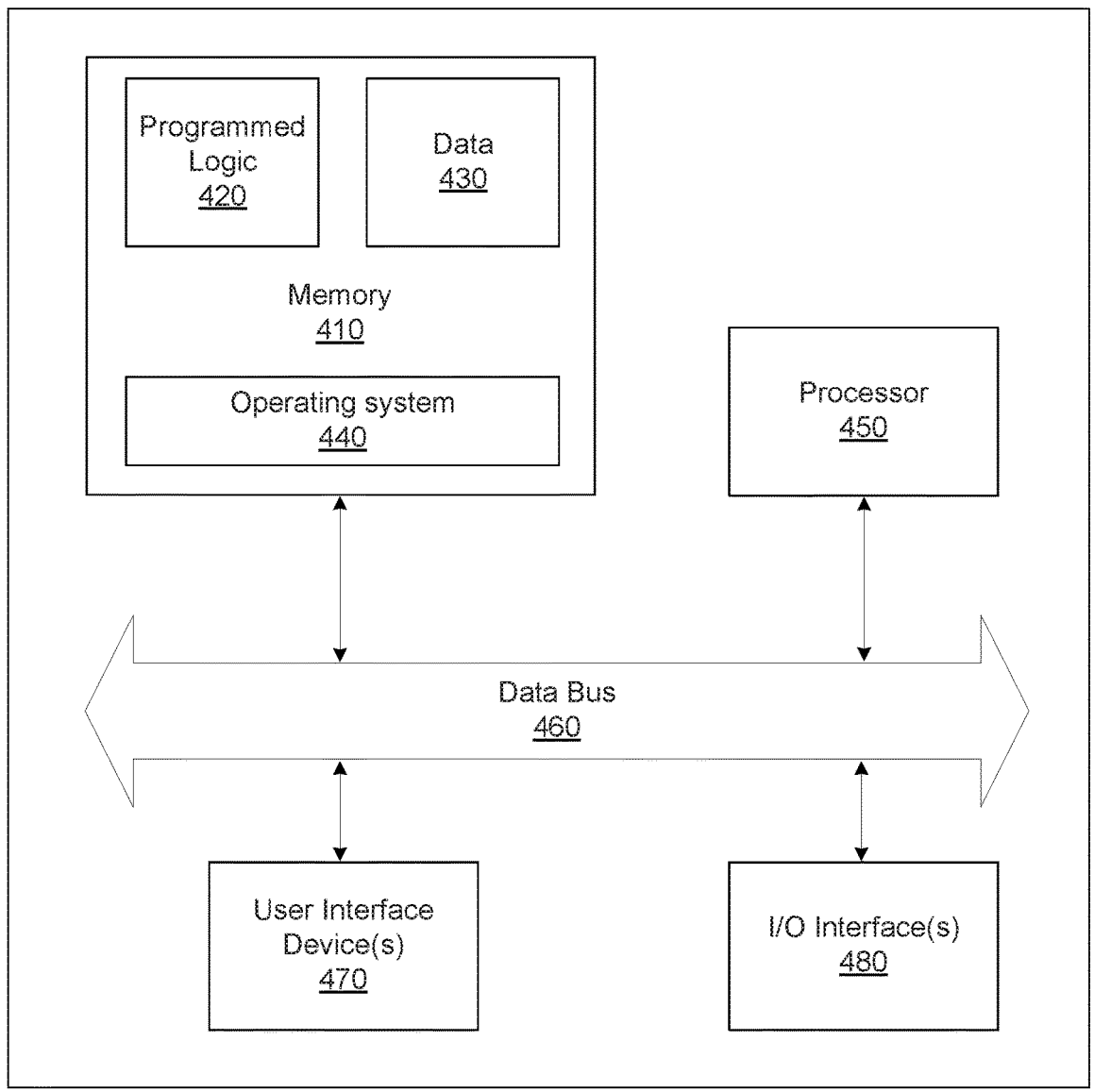
FIG. 4 is a block diagram illustrating an example controller for management of an electrical grid, in accordance with some embodiments of the disclosure.

FIG. 4 depicts a block diagram illustrating an example electrical grid controller 400, in accordance with an embodiment of the disclosure. More specifically, the elements of the electrical grid controller 400 may be used to analyze operational data measured form electrical grid components and generate one or more electrical grid restoration plans. The electrical grid controller 400 may include a memory 410 that stores programmed logic 420 (e.g., software) and may store data 430, such as operational data associated with the electrical grid 110, the set of constants, and the like. The memory 410 also may include an operating system 440.

A processor 450 may utilize the operating system 440 to execute the programmed logic 420, and in doing so, may also utilize the data 430. A data bus 460 may provide communication between the memory 410 and the processor 450. Users may interface with the electrical grid controller 400 via at least one user interface device 470, such as a keyboard, mouse, control panel, or any other device capable of communicating data to and from the electrical grid controller 400. The electrical grid controller 400 may be in communication with other elements of the system 100 while operating via an input/output (I/O) interface 480. Additionally, it should be appreciated that other external devices or multiple other systems may be in communication with the electrical grid controller 400 via the I/O interface 480. In some embodiments of the disclosure, the electrical grid controller 400 may be located remotely with respect to the other elements of the system 100; however, in other embodiments of the disclosure, it may be co-located or even integrated with the system 100. Further, the electrical grid controller 400 and the programmed logic 420 implemented thereby may include software, hardware, firmware, or any combination thereof. It should also be appreciated that multiple electrical grid controllers 400 may be used, whereby different features described herein may be executed on one or more different electrical grid controllers 400.

References are made to block diagrams of systems, methods, apparatuses, and computer program products, according to example embodiments of the disclosure. It will be understood that at least some of the blocks of the block diagrams, and combinations of blocks in the block diagrams, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

One or more components of the systems and one or more elements of the methods described herein may be implemented through an application program running on an operating system of a computer. They also may be practiced with other computer system configurations, including handheld devices, multiprocessor systems, microprocessor based or programmable consumer electronics, mini-computers, mainframe computers, and the like.

Application programs that are components of the systems and methods described herein may include routines, programs, components, data structures, and so forth that implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated that the disclosure may be embodied in many forms and should not be limited to the example embodiments described above.

Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for electrical grid restoration, the system comprising:
   a processor in communication with executable instructions stored in a non-transitory computer readable medium, the executable instructions when accessed by the processor cause the processor to implement:
   a real-time monitoring module configured to acquire operational data associated with electrical grid components of an electrical grid; and
   a restoration manager module configured to:
   detect, based on the operational data, one or more events in the electrical grid, the one or more events including unplanned outages;
   in response to the detection, analyze the operational data to determine a restoration plan, the restoration plan including one or more operations associated with commands for at least one control device, wherein the at least one control device is operable to control a power transmission between the electrical grid components; and
   execute the one or more operations of the restoration plan to restore the electrical grid to a normal operational state.

2. The system of claim 1, wherein the restoration manager module is further configured to determine, based on the operational data:
   a location and cause of islanding events in the electrical grid;
   composition of islands; and
   a location and electrical conditions of inter-island synchronization points.

3. The system of claim 2, wherein the restoration manager module is further configured to detect, based on the operational data, a microgrid in the islands.

4. The system of claim 1, wherein prior to the determination of the restoration plan, the restoration manager module is configured to determine, based on the operational data:
   at least one of the electrical grid components going out of service or coming back into service;
   location of the at least one of the electrical grid components;
   magnitude and location of one of a generation loss or a load loss in the electrical grid;
   megawatt reserves and megavolt-ampere reactive reserves in the electrical grid;
   a frequency and a rate of change of the frequency in the electrical grid;
   an inertia of the electrical grid; and
   a steady state and dynamic violations in the electrical grid.

5. The system of claim 1, wherein the restoration manager module is further configured to select, based on the operational data, the restoration plan from at least one pre-defined restoration plan.

6. The system of claim 5, wherein the at least one pre-defined restoration plan is stored in a database in a node-breaker format.

7. The system of claim 1, wherein the restoration manager module is further configured to:
  receive, from a user, an input of at least one source and at least one destination of the electrical grid components;
  acquire physical conditions of the electrical grid;
  estimate a feasibility of one or more operations for restoration of electrical grid; and
  compute, based on the physical conditions and the feasibility, the restoration plan for a restoration of the power transmission from the at least one source to the at least one destination.

8. The system of claim 1, wherein the restoration manager module is further configured to predict: changes in the operational data; and inconsistencies resulting from the execution of the one or more operations of the restoration plan.

9. The system of claim 8, wherein the analysis to predict changes in the operational data and the inconsistencies includes one or more of: a topology analysis, a steady state analysis, and a dynamic analysis.

10. The system of claim 1, wherein the restoration manager module is further configured to provide a real-time feedback for changes in the operational data after the execution of the one or more operations of the restoration plan.

11. A non-transitory computer readable medium containing executable instructions that cause a processor to perform a method for electrical grid restoration, the method comprising:
  acquiring, by a real-time monitoring module, operational data associated with electrical grid components of an electrical grid;
  detecting, by a restoration manager module and based on the operational data, one or more events in the electrical grid, the one or more events including unplanned outages;
  in response to the detection, analyzing, by the restoration manager module, the operational data to determine a restoration plan, the restoration plan including one or more operations associated with commands for at least one control device, wherein the at least one control device is operable to control a power transmission between the electrical grid components; and
  executing, by the restoration manager module, the one or more operations of the restoration plan to restore the electrical grid to a normal operational state.

12. The method of claim 11, wherein the analyzing the operational data includes determining:
  a location and cause of islanding events in the electrical grid;
  composition of islands; and
  a location and electrical conditions of inter-island synchronization points.

13. The method of claim 12, wherein the analyzing the operational data further includes detecting a microgrid in the islands.

14. The method of claim 11, further comprising prior to the determination of the restoration plan, determining, by the restoration manager module and based on the operational data, at least one of:
  at least one of the electrical grid components going out of service or coming back in to service;
  location of the at least one of the electrical grid components;
  a magnitude and a location of one of generation loss or load loss in the electrical grid;
  megawatt reserves and megavolt-ampere reactive reserves in the electrical grid;
  a frequency and a rate of change of the frequency in the electrical grid;
  an inertia of the electrical grid; and
  a steady state and dynamic violations in the electrical grid.

15. The method of claim 11, wherein the determination of the restoration plan includes selecting, based on the operational data, the restoration plan from at least one pre-defined restoration plan.

16. The method of claim 15, wherein the at least one pre-defined restoration plan is stored in a database in a node-breaker format.

17. The method of claim 11, further comprising:
  receiving, by the restoration manager module from a user, an input of at least one source and an input of at least one destination of the electrical grid components;
  acquiring, by the restoration manager module, physical conditions of the electrical grid;
  estimating, by the restoration manager module, a feasibility of one or more operations for restoration of electrical grid; and
  computing, by the restoration manager module and based on the physical conditions and feasibility, the restoration plan for a restoration of the power transmission from the at least one source to the at least one destination.

18. The method of claim 11, further comprising performing, by the restoration manager module an analysis to predict: changes in the operational data; and inconsistencies resulting from the execution of the at least one operation of the restoration plan.

19. The system of claim 18, wherein the analysis to predict the changes and the inconsistencies includes one or more of: a topology analysis, a steady state analysis, and a dynamic analysis.

20. A system for electrical grid restoration, the system comprising:
  a processor in communication with executable instructions stored in a non-transitory computer readable medium, the executable instructions when accessed by the processor cause the processor to implement:
  a real-time monitoring module configured to acquire operational data associated with electrical grid components of an electrical grid; and
  a restoration manager module configured to:
  determine, based on the operational data, one or more events in the electrical grid, the one or more events including unplanned outages;
  in response to the determination:
  analyze the operational data to determine:
  at least one of the electrical grid components going out of service or coming back in to service;
  a location of the at least one of the electrical grid components;
  a magnitude and a location of one of generation loss or load loss in the electrical grid;
  megawatt reserves and megavolt-ampere reactive reserves in the electrical grid;
  a frequency and a rate of change of the frequency in the electrical grid;
  an inertia of the electrical grid; and
  a steady state and dynamic violations in the electrical grid;
  determine, based on the operational data and a result of the analysis, a restoration plan, the restoration plan including at least one operation associated with commands for one or more control devices, wherein the one or more control devices are operable to control a power transmission between the electrical grid components, and wherein the determination of the restoration plan includes one of:

selecting the restoration plan from at least one pre-defined restoration plan;

or computing the restoration plan based on a user-defined source and a user-defined destination of one or more of the electrical grid components; and executing the at least one operation of the restoration plan to restore the electrical grid to a normal operational state.

\* \* \* \* \*